United States Patent
De Groot (10) Patent No.: US 7,068,376 B2
(45) Date of Patent: Jun. 27, 2006

(54) INTERFEROMETRY METHOD AND APPARATUS FOR PRODUCING LATERAL METROLOGY IMAGES

(75) Inventor: Peter J. De Groot, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 338 days.

(21) Appl. No.: 10/419,061

(22) Filed: Apr. 18, 2003

(65) Prior Publication Data

US 2003/0197871 A1 Oct. 23, 2003

Related U.S. Application Data

(60) Provisional application No. 60/373,791, filed on Apr. 19, 2002.

(51) Int. Cl.
*G01B 9/02* (2006.01)

(52) U.S. Cl. .................... 356/497; 356/512
(58) Field of Classification Search ............ 356/497, 356/511, 512, 513, 514, 489, 495
See application file for complete search history.

(56) References Cited

U.S. PATENT DOCUMENTS 6,741,357 B1 * 5/2004 Wang et al. ............. 356/495

OTHER PUBLICATIONS

Phase Shifting Interfrometry, Wyant, 1998.*
Peter de Groot, "Derivation of algorithms for phase-shifting interferometry using the concept of a data-sampling window", *Applied Optics*, vol. 34, No. 22, pp. 4723-4730 (Aug. 1, 1995).
Peter de Groot, "Phase-shift calibration errors in interferometers with spherical Fizeau cavities", *Applied Optics*, vol. 34, No. 16, pp. 2856-2863 (Jun. 1, 1995).
Joanna Schmit et al., "Extended averaging technique for derivation of error-compensating algorithms in phase-shifting interferometry", *Applied Optics*, vol. 34, No. 19, pp. 3610-3619 (Jul. 1, 1995).

* cited by examiner

*Primary Examiner*—Samuel A. Turner
(74) *Attorney, Agent, or Firm*—Fish & Richardson P.C.

(57) ABSTRACT

A method including: generating a sequence of phase-shifted interferometry images of an object surface relative to a reference surface; and calculating an unequally weighted average of the phase-shifted interferometry images to produce a final image. The final image can be useful as a lateral metrology image. The method may further include calculating a surface topography image from the sequence of phase-shifted interferometry images. Embodiments further include apparatus related to the method.

38 Claims, 6 Drawing Sheets

INTERFEROMETRY METHOD AND APPARATUS FOR PRODUCING LATERAL METROLOGY IMAGES

CROSS-REFERENCE TO RELATED APPLICATIONS

This application claims priority under 35 U.S.C §119(e) to U.S. Provisional Patent Application Ser. No. 60/373,791 by Peter J. de Groot and filed Apr. 19, 2002, the contents of which are incorporated herein by reference.

BACKGROUND

This invention relates to interferometry, and more particularly to phase-shifting interferometry and generating lateral metrology images from phase-shifted interferometry images.

Interferometric optical techniques are widely used to measure optical thickness, flatness, and other geometric and refractive index properties of precision optical and mechanical components.

For example, to measure the surface profile of an object surface, one can use an interferometer to combine an object wavefront reflected from the object surface with a reference wavefront reflected from a reference surface to form an optical interference pattern. Spatial variations in the intensity profile of the optical interference pattern correspond to phase differences between the combined object and reference wavefronts caused by variations in the profile of the object surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns, which typically span at least a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI may be produced by changing the optical path length from the object surface to the interferometer relative to the optical path length from the reference surface to the interferometer (i.e., the "optical path length difference" between the object and reference wavefronts is varied). For example, the reference surface may be moved relative to the measurement surface. The light source may be either narrow-band source or a broadband source. In the latter case, the optical path length difference may be varied over a range larger than the coherence length of the source to localize interferometric fringes and obviate the $2\pi$ phase ambiguity otherwise present in narrow-band PSI. Such interferometry methods are referred to as "Scanning White-Light Interferometry" or "Scanning Broadband Interferometry," see, e.g., N. Balasubramanian in U.S. Pat. No. 4,340,306 and Colonna de Lega et al. in U.S. Pat. No. 6,195,168, respectively. In additional interferometry systems, the phase-shifts may be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

While PSI can extract surface height information from interferometric fringes in the phase-shifted optical interference patterns or images, those same interference fringes can obscure lateral metrology features in the images, such as linewidths or x,y feature positions. To obtain such lateral metrology images, state-of-the-art lateral metrology generally relies on intensity patterns generated by conventional non-interferometric imaging systems.

SUMMARY

To provide multi-function capability (e.g., a surface height profile and a lateral metrology image) with a PSI interferometer, it is desirable to be able to obtain a lateral metrology image (i.e., an image substantially free of optical interference fringes) from the PSI images produced by the PSI interferometer. One approach to provide such functionality is to average together a sequence of equally-spaced phase-shifted images that span $2\pi$ in overall phase shift to substantially null out the interferometric fringes and produce a lateral metrology image. However, the inventor has discovered that such averaging may be imperfect and can lead to "print through" errors in which the fringe pattern persists in the averaged imaged. The imperfections are caused by the sensitivity of such averaging to environmental and systematic effects that cause the phase shifts to deviate from a preset, nominal sequence. For example, environmental effects may include vibration, air turbulence, source fluctuations, and other disturbances. Also, for example, systematic effects are present in scanning broadband interferometry systems because the broad frequency content in the interference signal causes a spread in phase shift frequency about the preset, nominal sequence.

The inventor has discovered that an unequally weighted average of a sequence of phase-shifted interferometry images can null out the interferometric fringes and produce a lateral metrology image in which "print through" errors caused by deviations of the phase shift sequence from a preset, nominal sequence are minimized. The sequence of phase-shifted interferometry images may correspond to data collected by an electronic camera in a PSI interferometry system. The weighting factor for each image is selected so as to suppress interference fringe print through even under non-ideal conditions, e.g., small errors in intended phase shift, vibrations, variable fringe contrast across the field and over the sequence of phase shifts, and so on. The final intensity image may then be processed to determine the lateral positions and dimensions of part features, or to determine any other surface characteristic for which it is desirable to suppress the interference information. At the same time, the sequence of phase-shifted intensity images can be used to determine surface topography by using a phase extraction algorithm.

As a result, phase-shifted interferometry data collected by a PSI interferometer can be used to produce both an interferometric phase image (e.g., a surface topography profile, thickness profile, or the like) of an object and lateral metrology image of the object, thereby improving the functionality of the instrument without increase instrument cost (e.g., there is no need for auxiliary optics or an additional camera). Moreover, the weighted averaging can be selected to make the apparatus robust under non-ideal conditions when calculating an intensity image free of interference fringes.

We now summarize various aspects and features of the invention.

In general, in one aspect, the invention features a method including: generating a sequence of phase-shifted interferometry images of an object surface relative to a reference surface; and calculating an unequally weighted average of the phase-shifted interferometry images to produce a final image.

Embodiments of the method may include any of the following features.

The unequally weighted average can reduce interferometric fringes in the final image relative to those in a second final image produced by an equally weighted average of the phase-shifted interferometry images for an equally spaced phase shift sequence that spans $2\pi$.

The final image can be a lateral metrology image.

Generating the sequence of phase-shifted interferometry images can include: interfering a pair of wavefronts derived from a common source, wherein one of the wavefronts reflects from the object surface and the other wavefront reflects from the reference surface, and introducing a sequence of phase-shifts between the interfering wavefronts. For example, each of the phase-shifted interferometry images may correspond to an intensity image formed by the interfering wavefronts for a corresponding one of the phase shifts.

Introducing the sequence of phase shifts can include varying an optical path length difference between the interfering wavefronts. For example, the optical path length difference can be varied over a range smaller than the coherence length of the common source. Alternatively, the optical path length difference can be varied over a range comparable to, or larger than, the coherence length of the source.

Introducing the sequence of phase shifts can include varying a wavelength of the common source for a non-zero optical path length difference between the interfering wavefronts.

The phase shift between each pair of adjacent images in the sequence of phase-shifted interferometry images can be equal to a constant. For example, the constant can be equal to $\pi/4$ with respect to a wavelength in light used to produce the interferometry images.

The sequence of phase-shifted interferometry images may be expressed mathematically as: $g_{i,j}(\theta_i,v)=Q_i(1+V\cos(\theta_i+\phi_j))$, where $g_{i,j}$ is an intensity for the $i^{th}$ pixel of the $j^{th}$ image in the sequence, $\theta_i$ is a phase for the $i^{th}$ pixel of the object surface relative to the reference surface, where $v$ is a phase shift frequency with respect to a nominal phase shift sequence, $Q_i$ is a DC level for the $i^{th}$ pixel, V is a fringe contrast, and $\phi_j$ is a nominal phase shift for the $j^{th}$ image in the sequence. The final image, $A_i$, may be expressed $$as : A_i(\theta_i, v) = \sum_j w_j g_{i,j}(\theta_i, v) \Big/ \sum_j w_j,$$

where $w_j$ is a sequence of coefficients defining the unequally weighted average, and wherein the unequally weighted average requires $w_j$ to not be constant for all j. The phase shift may be expressed as $\phi_j=(j-j_0)\alpha$, where $j=0, \ldots, P-1$, P is the number of images in the sequence, $\alpha$ is a constant phase shift interval, and $j_0$ is a constant selected to cause $\phi_{(P-1)-j}=-\phi_j$.

The sequence of weighting coefficients $w_j$ may be selected to satisfy: $W(v=1)=0$ and $$\frac{\partial W(v)}{\partial v}\bigg|_{v=1} = 0,$$

where $$W(v) = \sum_j w_j \cos(v\phi_j).$$

The weighting coefficients $w_j$ may be selected to further satisfy $$\frac{\partial^2 W(v)}{\partial v^2}\bigg|_{v=1} = 0.$$

Specific examples of the weighting coefficients $w_j$ may include any of P=6 and $w_j=[1,1,2,2,1,1]$, P=7 and $W_j=[1,2,3,4,3,2,1]$, and P=8 and $W_j=[1,1,3,3,3,3,1,1]$ The method may further include calculating a surface profile of the object surface relative to the reference surface based on the series of phase-shifted images. For example, the method may further including calculating a surface profile of the object surface relative to the reference surface by applying a phase-shifting algorithm to the sequence of phase-shifted images to extract the phases $\theta_i$.

In general, in another aspect, the invention features a method including calculating an unequally weighted average of a sequence of phase-shifted interferometry images to produce a final image.

In general, in another aspect, the invention features an apparatus including a computer readable medium which causes a processor to calculate an unequally weighted average of a sequence of phase-shifted interferometry images to produce a final image.

In general, in another aspect, the invention features an apparatus including: an interferometer which during operation generates a sequence of phase-shifted interferometry images of an object surface relative to a reference surface; and an electronic controller coupled to the interferometer, wherein during operation the electronic controller calculates an unequally weighted average of the phase-shifted interferometry images to produce a final image.

Embodiments of the apparatus may include any of the following features.

During operation the electronic controller may further calculate a surface profile of the object surface relative to the reference surface based on the sequence of phase-shifted interferometry images.

The unequally weighted average may reduce interferometric fringes in the final image relative to those in a second final image produced by an equally weighted average of the phase-shifted interferometry images for an equally spaced phase shift sequence that spans $2\pi$.

The interferometer may include one of a Linnik interferometer, a Michelson interferometer, and a Fizeau interferometer.

The interferometer may include a scanning interferometer including a broadband source having a coherence length, wherein during operation the scanning interferometer interferes an object wavefront reflected from the object surface with a reference wavefront reflected from the reference surface and varies an optical path length difference between the wavefronts over a range larger than the coherence length of the source.

The interferometer may include an unequal path length interferometer including a tunable source, wherein during operation the unequal path length interferometer introduces phase shifts between an object wavefront reflected from the object surface and a reference wavefront reflected from the reference surface by varying the wavelength of the source.

In general, in another aspect, the invention features a method for obtaining a fringe-free intensity image from a sequence of phase-shifted interference patterns. The method includes: providing the sequence of phase-shifted interference patterns; and calculating a weighted average of the phase-shifted interference patterns to produce the fringe-free intensity image.

Embodiments of the method include any of the following features.

The sequence of phase-shifted interference patterns can include more than four patterns.

The weights for the weighted average can be selected to reduce the sensitivity of the weighted average to a deviation in the phase increment between the phase-shifted interference patterns. For example, the weights can define a window function, and the derivative of the Fourier transform of the window function with respect to the deviation in the phase increment can be zero when the deviation is zero.

The method may further include calculating a surface topology map from the sequence of phase-shifted interference patterns.

The method may further include using an interferometry system to provide the sequence of phase-shifted interference patterns. For example, the interferometry system can be a white-light scanning interferometry system. Alternatively, the interferometry system can be a wavelength-tuning interferometry system.

In general, in another aspect, the invention features an interferometry system including: an interferometer for providing a sequence of phase-shifted interference patterns; and an electronic controller coupled to the interferometer, wherein during operation the interferometer calculates a weighted average of the phase-shifted interference patterns to produce a fringe-free intensity image. Furthermore, in some embodiments, the electronic controller calculates a surface topography map from the sequence of phase-shifted interference patterns. Additional features of the interferometry system include any of those described above in connection with the inventive interferometry method.

As used herein, "weighted average" of images means an averaging that assigns greater emphasis to some images than others.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Other features, objects, and advantages of the invention will be apparent from the following detailed description.

DETAILED DESCRIPTION

Figure 1:
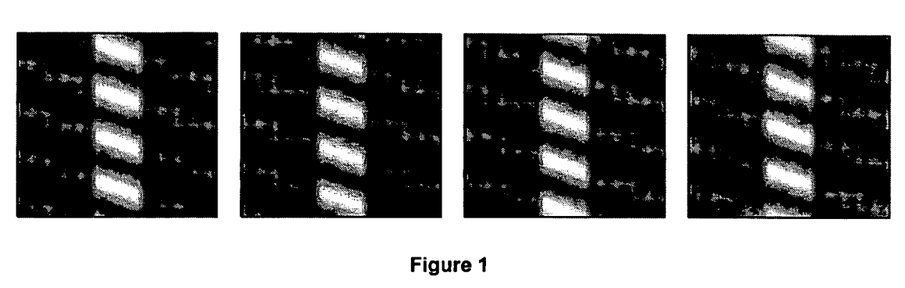
FIG. 1 are pictures of a simulated sequence of phase-shifted interferometry images for a flat object having a brightly-reflecting center strip.

Form-measuring phase shifting interferometry (PSI) extracts surface profiles by determining the interference phase as precisely as possible for each image pixel in the field of view. The raw data for this phase extraction is a sequence of interference fringe images acquired by an electronic camera. A typical image sequence is shown in FIG. 1, which shows simulated interference images of a flat object having a brightly-reflecting center stripe feature. The images from left to right are phase shifted in sequence by an amount nominally equal to $\pi/2$.

Although the primary purpose of PSI is to leverage the surface height information contained in interference fringes, there are occasions where these very same fringes are undesirable. State-of the art lateral metrology, meaning for example linewidths or x,y feature positions, generally relies on intensity patterns generated by conventional non-interferometric imaging systems. In these situations, the desired image would be free of interference fringes.

Figure 2:
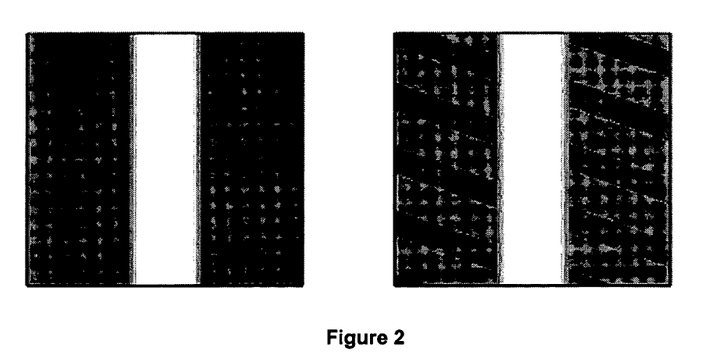
FIG. 2 are pictures of simulated images in which the images in FIG. 1 are averaged for phase shift exactly equal to $\pi/2$ (left image) and phase shifts that differ from $\pi/2$ by 5% (right image).

One technique for generating a fringe-free intensity pattern from a sequence of interference images such as those shown in FIG. 1 is to sum together the intensities of the sequence of interference images to produce final image suitable for lateral metrology. Unfortunately, the fringe pattern can still print though such final images in many instances. See the example in FIG. 2, which shows numerical simulations of the final image produced by averaging the sequence four phase-shifted images in FIG. 1. The left image in FIG. 2 shows the result where the phase shifts are exactly equal to π/2, and the right image in FIG. 2 shows the result when the phase shifts differ from π/2 by 5%, in which case the interferometric fringes "print through" the final image despite the averaging.

To address such print through errors, the invention features an interferometry method and apparatus in which several intensity images are acquired via an electronic camera for a sequence of phase shifts, and a weighted average of these images (i.e., an averaging that assigns greater emphasis to some images than others) is calculated to generate a final intensity image free of the interference fringe patterns. A weighting factor for each image is selected so as to suppress interference fringe print through even under non-ideal conditions, e.g., small errors in intended phase shift, vibrations, variable fringe contrast across the field and over the sequence of phase shifts, and so on. The final intensity image may then be processed to determine the lateral positions and dimensions of part features, or to determine any other surface characteristic for which it is desirable to suppress the interference information. At the same time, the sequence of phase-shifted intensity images can be used to determine surface topography by using a phase extraction algorithm. As a result, the interferometry apparatus provide a measurement system capable of simultaneous surface topography using interference data and lateral-dimension metrology using an intensity image derived from interference data. Moreover, the weighted averaging can be selected to make the apparatus robust under non-ideal conditions when calculating an intensity image free of interference fringes.

I first present mathematically in some detail the nature of the averaging task for generating a fringe-free intensity image from interference data. After defining the interference intensity signal mathematically, I then write a fairly general formula for averaging to estimate this fringe-free or "DC" (=unmodulated) signal. A calculation of the error and its phase dependence follows, leading to a general statement of the requirements for a good DC averaging algorithm using a sampling window values as the adjustable parameters for optimization. This leads to embodiments of the inventive method and algorithms for optimal calculation of the fringe-free image.

Figure 3:
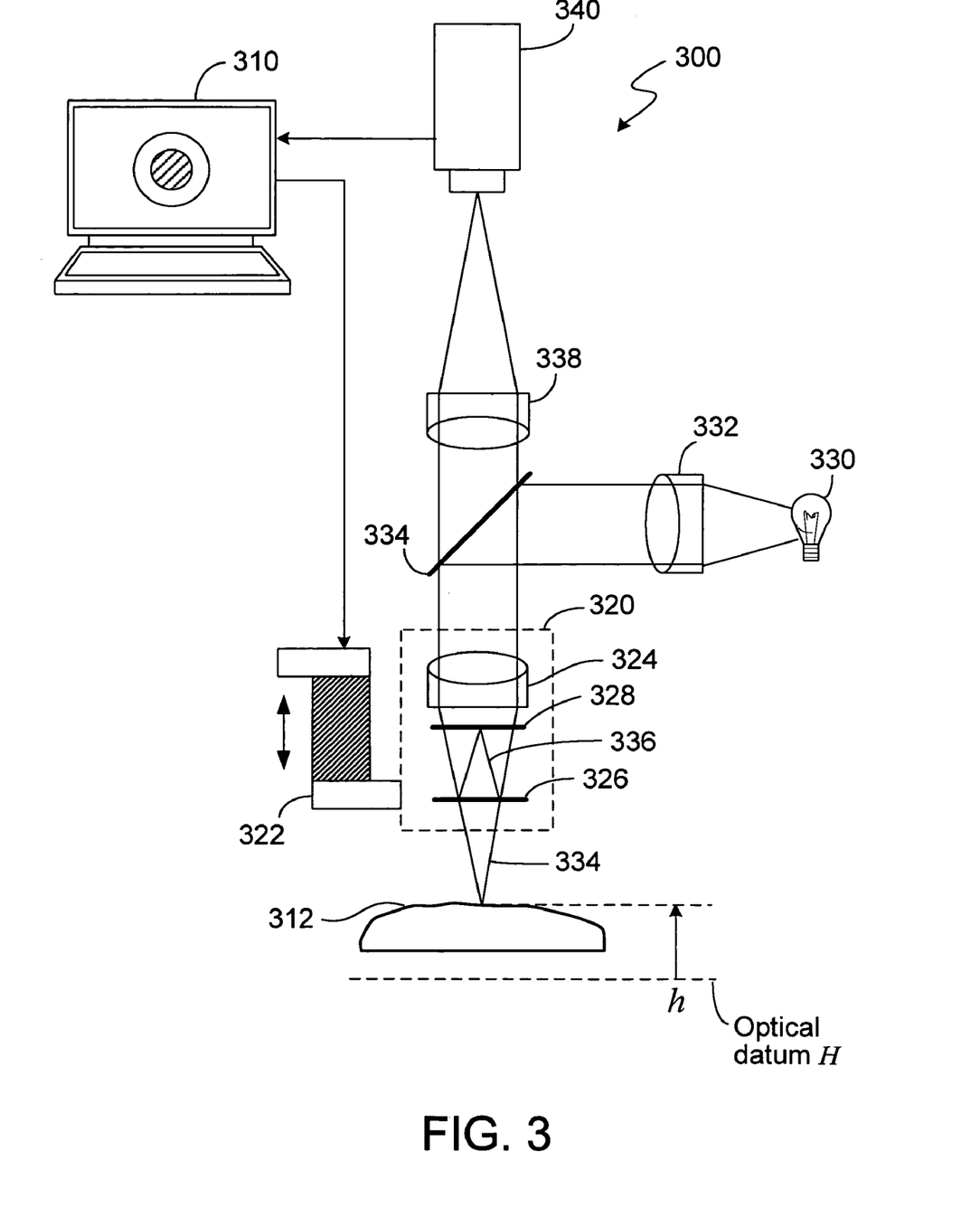
FIG. 3 is a schematic diagram of one embodiment of a PSI interferometer.

In an interferometer system 300 shown in FIG. 3, a computer 310 acquires interference patterns of the surface of an object part 312 for a sequence of P equidistant phase shifts generated by a mechanical motion of an interference objective 320 via a piezoelectric transducer (PZT) 322. The interferometer system includes a light source 330 whose output is collimated by lens 332 and then directed by beam-splitter 334 to interference objective 320, which includes objective lens 324, beamsplitter 326, and reference surface 328. Beamsplitter 326 transmits a first portion of the light source output to define an object wavefront 334, which then reflects from the surface of object part 312, and reflects a second portion of the light source output to define a reference wavefront 336, which then reflects from reference surface 328. Beamsplitter 326 then recombines the reflected wavefronts, which are imaged via objective 320, beamsplitter 334, and an imaging lens 338 onto a camera 340 where they interfere with one another to form an interference intensity pattern. The camera sends data representative of each interference intensity pattern to computer 310 for each phase shift generated by PZT 322.

The phase shifts are $$\phi_j = (j-j_0)\alpha \qquad (1)$$

for $$j = 0 \ldots P-1 \qquad (2)$$

where α is the nominal phase shift interval between data acquisitions and $j_0$ is defined such that the phase shifts are asymmetric:

$$\phi_{(P-1)-j} = -\phi_j. \qquad (3)$$

For example, if P=4 and α=π/2, then symmetric equidistant phase shifts would be $$\phi = \{-3\pi/4, -\pi/4, +\pi/4, +3\pi/4\}. \qquad (4)$$

In a two-beam interferometer (such as the one in FIG. 3), the corresponding phase-shifted intensity signals for a single image point in the fringe pattern (i.e., in the sequence of phase-shifted interferometry images) are $$g_j(\theta,\nu) = Q(1+V\cos(\theta+\nu\phi_j)), \qquad (5)$$

where θ is the phase that we are interested in for surface profiling, V is the fringe visibility and ν≈1 is the phase shift frequency with respect to the nominal or expected phase shift sequence. Strictly speaking, the fringe visibility V can vary during the phase shift scan when the total optical path length difference during the scan is comparable to the coherence length of the source. In all practical cases, however, P is small enough that this optical path length difference, OPD=αPλ/2π where λ is the nominal wavelength of the source output, is small enough relative to the coherence length of source 330 to ignore any variation in V. The overall coefficient Q is the DC level of the signal.

Phase shifting interferometry (PSI) algorithms extract phase using the equivalent of the following formula:

$$\theta = \arctan\left(\frac{\sum s_j g_j(\theta, \nu=1)}{\sum c_j g_j(\theta, \nu=1)}\right) \qquad (6)$$

where for symmetric algorithms $$s_j = w_j \sin(\phi_j) \qquad (7)$$

$$c_j = w_j \cos(\phi_j). \qquad (8)$$

and $w_j$ is the sampling window. Using the P=4 example, we have $$w = (1\ 1\ 1\ 1), \qquad (9)$$

$$\theta = \arctan\left(\frac{-g_0 - g_1 + g_2 + g_3}{-g_0 + g_1 + g_2 - g_3}\right). \qquad (10)$$

Eq.(10) can be simplified by introducing a π/4 offset into the phase shift, but the properties of the algorithm are unchanged; therefore I shall continue to use symmetric phase shifts for clarity.

Turning now to the problem of estimating DC level, which corresponds to the fringe-free intensity image that we desire, we define $$A(\theta,v)=\Sigma w_j g_j(\theta,v)/\Sigma w_j. \quad (11)$$

where I have once again included a sampling window $w_j$. A goal for obtaining a fringe-free image is to use a sampling window such that $$A(\theta,v)=Q \quad (12)$$

at the nominal phase shift frequency v=1 for all phases θ. To derive the appropriate window, I first combine Eq.(5) with Eq.(11) to obtain $$A(\theta, v) = \frac{Q}{\sum w_j}\left[\sum w_j + V\sum w_j \cos(\theta + v\varphi_j)\right], \quad (13)$$

which can also be written $$A(\theta, v) = \frac{Q}{W(0)}[W(0) + W(v)V\cos(\theta)]. \quad (14)$$

where $$W(v)=\Sigma w_j \cos(v\phi_j) \quad (15)$$

is the Fourier Transform of the symmetric sampling window $w_j$ (the odd or sine portion of the transform is zero for a symmetric window). Therefore W(v) may be thought of as the frequency response of the window. Clearly from Eq.(14), the averaging formula is a good measure of Q at v=1 only when $$W(v=1)=0, \quad (16)$$

which one can readily verify is satisfied for the P=4 example of Eq. (9). For those cases where v≠1, there is an additional error term in the estimation of the DC level:

$$\text{error}(\theta, v) = \frac{W(v)}{W(0)}V\cos(\theta) \quad (17)$$

The error is cyclic, in phase with and with the same frequency as the main signal g(θ,v). This error generates unwanted fringe-like modulations in the final image, so in preferred embodiments of the invention it is a goal to keep this error term small.

Figure 4:
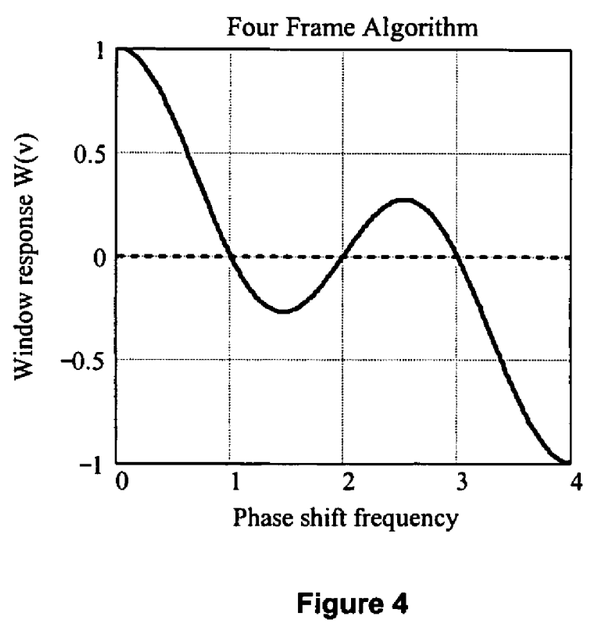
FIG. 4 is a graph of the frequency response $W(v)$ for an equal-weight four-frame average.
Figure 5:
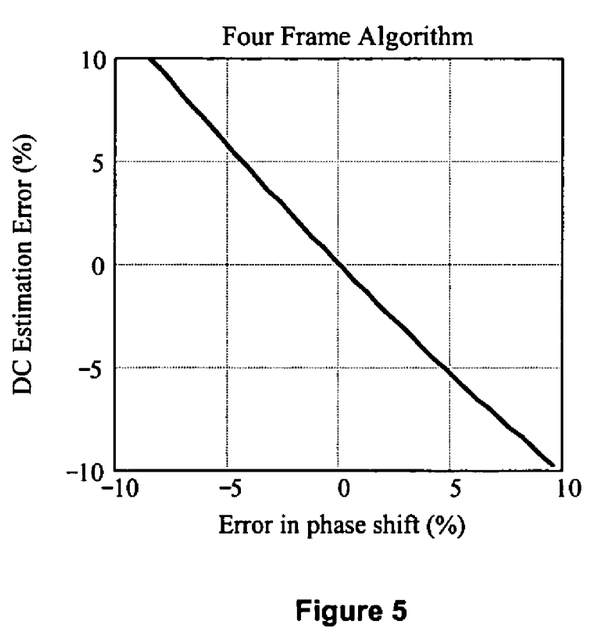
FIG. 5 is a graph of the DC estimation error corresponding to the frequency response in FIG. 4 for values of the phase shift frequency v within 10% of v=1.

As per Eq.(17) large values of W(v) for v≠1 correspond to high sensitivity to minor disturbances in the phase shift increment and the stability of the DC averaging. The graph in FIG. 4 shows the frequency response W(v) for the equal-weight four-frame average corresponding to Eq.(9). Inspection of FIG. 4 shows that while W(v=1)=0, the rate of change of W(v) about v=1 is large, which results is significant error. For example, the graph in FIG. 5 shows the DC estimation error corresponding to the frequency response in FIG. 4 for values of the phase shift frequency v within 10% of v=1. FIG. 5 shows, for example, that an error in phase shift of −10% causes greater than 10% of the fringe modulation to print through to the final image.

The task therefore is to identify a windowing function $w_j$ such that Eq.(16) is satisfied for a wide range of values about v≈1. Thus, I select window coefficients are not all the same, so, for example, certain camera frames will have greater weight than others in the averaging equation. One approach to developing a suitable unequal-weight window is to recognize that the error calculated by Eq.(17) follows a θ dependence characteristic of phase measurements. Therefore, the DC error changes sign every change in θ of π. A step towards improving DC averaging therefore would be to generate a six-frame window by summing two four-frame windows separated by two data acquisition frames for a total relative phase shift of 2α=π:

$$(1\ 1\ 1\ 1\ 0\ 0)+(0\ 0\ 1\ 1\ 1\ 1)=(1\ 1\ 2\ 2\ 1\ 1). \quad (18)$$

This is already a significant improvement. A second iteration results in the following eight-frame window:

$$w=(1\ 1\ 3\ 3\ 3\ 3\ 1\ 1). \quad (19)$$

Figure 6:
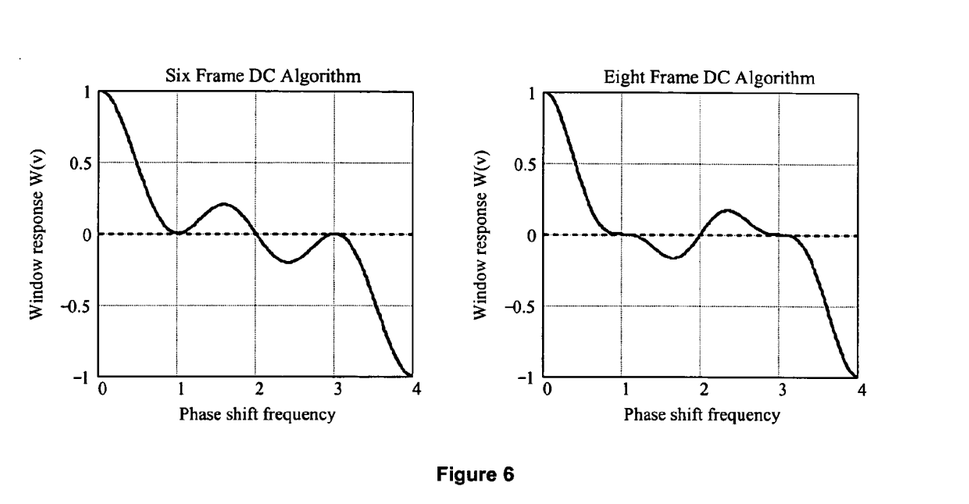
FIG. 6 are graphs of the frequency response $W(v)$ of unequally weighted six-frame (left) and eight-frame (right) averaging algorithms.
Figure 7:
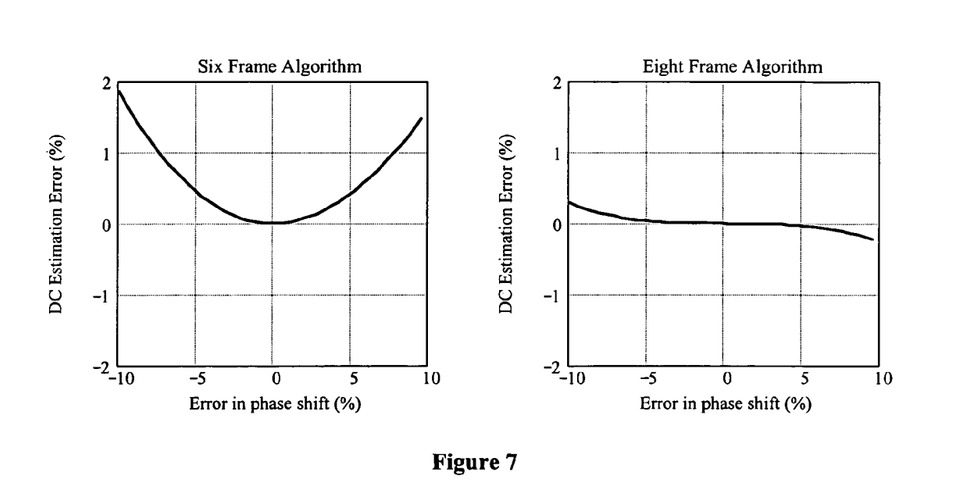
FIG. 7 are graphs of the DC estimation error corresponding to the unequally weighted six-frame (left) and eight-frame (right) averaging algorithms of FIG. 6.
Figure 8:
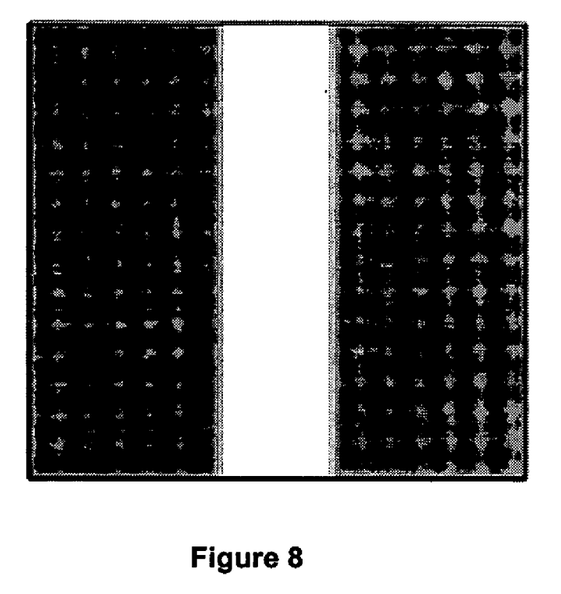
FIG. 8 is a picture of the final image corresponding to the flat object of FIGS. 1 and 2 produced when using the eight-frame algorithm of Eq.(19) to produce the final image in the presence of a phase-calibration error of 10%.

FIG. 6 shows the Fourier transforms (i.e., the frequency response W(v)) for the window functions of Eqs.(18) (left image) and (19) (right image), respectively. FIG. 7 shows the corresponding DC estimation error for the the window functions of Eqs. (18) (left image) and (19) (right image), respectively, for values of the phase shift frequency v within 10% of v=1. Note the 5× change in vertical scale and the substantial improvement relative to equal weight average of Eq. (9) in FIG. 5. Furthermore, in each case, note the flat response (zero derivative) in the region of v=1. The eight-frame algorithm, in particular, is more than 100× better than the four-frame algorithm over a phase shift error range of ±6%. FIG. 8 shows the final image corresponding to the stripe feature object of FIGS. 1 and 2 when the eight-frame algorithm is used to produce the final image for a phase-calibration error of 10%. As can be seen, the interference fringe pattern is nearly eliminated, in contrast to the right image in FIG. 2 (which only had a phase calibration error of 5%). Additional window function algorithms can be generated by applying the same window summing technique with different starting points, for example summing two five-frame windows offset by two frames to create a seven frame DC algorithm, and so on, as desired for specific circumstances.

Accordingly, examples of unequally weighted averages suitable for producing a lateral metrology image substantially free of interferometric fringe even in the presence of phase shift distortions include averaging algorithms for π/2 phase shifts derived from the sum of windows offset by two data acquisition frames. Specific examples are the following six, seven and eight frame algorithms, respectively:

$$Q = \frac{1}{8}(g_0 + g_1 + 2g_2 + 2g_3 + g_4 + g_5) \quad (20)$$

$$Q = \frac{1}{16}(g_0 + 2g_1 + 3g_2 + 4g_3 + 3g_4 + 2g_5 + g_6) \quad (21)$$

$$Q = \frac{1}{16}(g_0 + g_1 + 3g_2 + 3g_3 + 3g_4 + 3g_5 + g_6 + g_7), \quad (22)$$

where the $g_j$ are the intensity values recorded for an individual pixel for a sequence of data acquisitions j=0.5,6 or 7. The eight-frame algorithm of Eq.(22) (and Eq.(19)) provides approximately two orders of magnitude improvement over a simple equally-weighted four-frame average for the most common sources of error.

More generally, suitable weighting functions are selected to satisfy:

$$W(v=1) = 0 \text{ and } \left.\frac{\partial W(v)}{\partial v}\right|_{v=1} = 0. \quad (23)$$

The sensitivity of the weighting function to deviations in the phase shift frequency from v=1 can be further reduced by selecting the weighting function to further satisfy:

$$\left.\frac{\partial^2 W(v)}{\partial v^2}\right|_{v=1} = 0. \quad (24)$$

Indeed, the six- and seven-frame algorithms described above, which sum two equally-weighted multi-frame windows separated by acquisition frames corresponding to a total relative phase shift of π, satisfy Eq.(23), and the subsequent iteration that produced the eight-frame algorithm described above satisfies Eq.(24). In yet further embodiments, the weighted average can be selected to further minimize even higher order derivatives of W(v).

In practice, interference patterns are subject to a variety of distortions in addition to simple phase-shift calibration error. An important example occurs in scanning white-light (or broadband) interferometry, which uses a white-light source (or more generally a broadband source) and scans the relative path length of the object and reference legs of the interferometer. Because the source has a limited coherence length, interference fringes in the interferogram are only present where the optical path difference (OPD) between the object and reference paths for corresponding points on the object surface and the reference surface is less than the coherence length. Thus, the scanning interferometer can resolve a step, or an otherwise large and/or discontinuous, variation in the surface of interest by scanning the relative path length of the reference and measurement legs, recording multiple interferograms, and determining where in each interferogram interference fringes are present. Moreover, phase-shifting techniques can be combined with scanning interferometry to interpolate the phase of individual fringes and thereby more accurately determine surface variations. However, the broadband source that narrows the fringe contrast envelope likewise broadens the frequency content of the interference signal. Thus, even with the most careful calibration there exist nonetheless in the signal a range of phase shift frequencies other than the nominal v=1. This can lead to errors in the estimation of the DC level, the magnitude of which depends strongly on the frequency response of the sampling window, as demonstrated in the following example.

Figure 9:
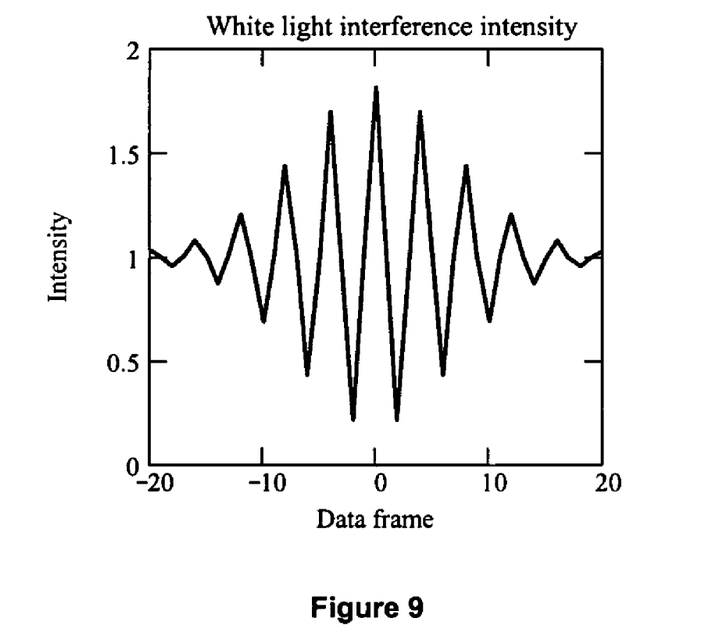
FIG. 9 is a graph of a simulated scanning broadband interference signal (for a particular camera pixel) for a scan involves forty data frames with phase shift intervals of $\pi/2$ for the center wavelength of the source.
Figure 10:
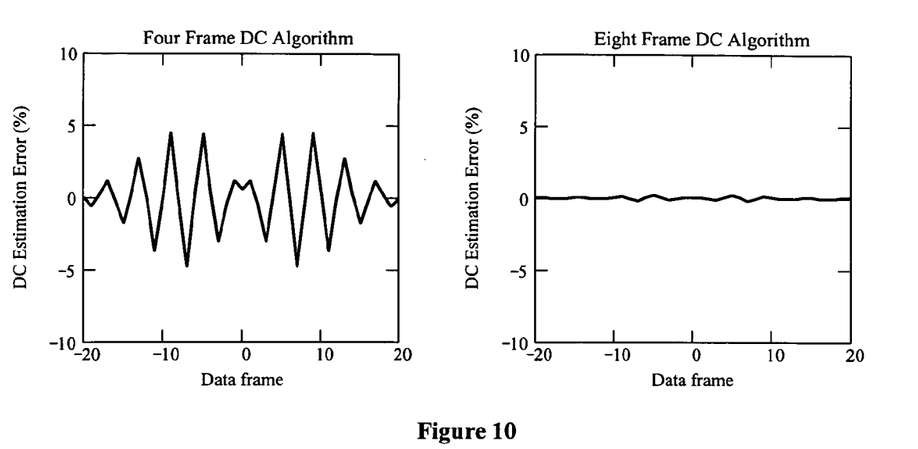
FIG. 10 are graphs of the DC estimation error for the four-frame algorithm of Eq.(9) (left) and the eight-frame algorithm of Eq.(19) (right) when different portions of the interference data of FIG. 9 are used to generate a lateral metrology image.

FIG. 9 shows a simulated scanning interference signal (for a particular camera pixel) for a scan involves forty data frames with phase shift intervals of π/2 for the center wavelength of the source. The total phase shift over the forty frames corresponds to an optical path length difference (OPD) between the object and reference legs of the interferometer that is larger than the coherence length of the source, thus the interference fringes are localized with the fringe contrast tending to zero for large absolute OPDs, as can be seen in FIG. 9. As described above, the broadband source causes the signal to include a range of phase shift frequencies other than the nominal v=1. FIG. 10 shows the DC estimation error when different portions of the interference data of FIG. 9 are used to generate a lateral metrology image. For example, the left image in FIG. 10 shows the DC estimation error when the equally-weighted four-frame algorithm of Eq.(9) is used to average a sequence of data points in the scanning interference data. The DC estimation error is plotted as function of the data frame about which the four-frame average is calculated. As shown in the left image, the DC estimation error is significant (e.g., approaching 5%), even though the data corresponds to phase shift increments exactly equal to π/2. The right image in FIG. 10 shows the DC estimation error when the unequally-weighted eight-frame algorithm of Eq.(19) is used to average a sequence of data points in the scanning interference data, in which case the DC estimation error is significantly less.

As described above, an unequally weighted average of a sequence of phase-shifted interferometry images can produce a final image having minimal fringe print-through even under non-ideal conditions, e.g., small errors in intended phase shift, vibrations, variable fringe contrast across the field and over the sequence of phase shifts, and so on. This final image can be used as a lateral metrology image, which may be processed to determine the lateral positions and dimensions of part features, or to determine any other surface characteristic for which it is desirable to suppress the interference information. Furthermore, information in the lateral metrology image can be used for global and regional light level control (e.g., optimizing the dynamic range of the camera), image segmentation, and dynamic PSI phase estimation using only two data frames and the DC level (thereby reducing computation).

At the same time, the sequence of phase-shifted intensity images can be used to determine surface topography by using a phase extraction algorithm. In particular, a phase extraction algorithm such as that expressed in Eq.(6) can be used to determine that phase θ at each camera pixel corresponding to the sequence of phase shifted images. Subject to the usual 2π phase ambiguity, the phase θ is related to the topography of the object surface by θ=4πh/λ, h is the surface height of the object surface relative to an optical datum plane H (see FIG. 3), where the optical datum plane corresponds to a zero optical path length difference relative to the reference surface. Specific examples of phase extraction algorithms that extract the interference phase θ proportional to surface height is given by one of the following algorithms for six, seven and eight data frames, respectively:

$$\theta = \arctan\left(\frac{-g_0 + 3g_1 + 4g_2 - 4g_3 - 3g_4 + g_5}{-g_0 - 3g_1 + 4g_2 + 4g_3 - 3g_4 - g_5}\right) \quad (25)$$

$$\theta = \arctan\left(\frac{-g_0 + 7g_2 - 7g_4 + g_6}{-4g_1 + 8g_3 - 4g_5}\right) \quad (26)$$

$$\theta = \arctan\left(\frac{-g_0 - 5g_1 + 11g_2 + 15g_3 - 15g_4 - 11g_5 + 5g_6 + g_7}{g_0 - 5g_1 - 11g_2 + 15g_3 + 15g_4 - 11g_5 - 5g_6 + g_7}\right), \quad (27)$$

More generally, phase extraction algorithms are known in the art, see, e.g., Daniel Malacara, editor, *Optical Shop Testing* (2nd Ed.), Chapter 14, p. 501 (Wiley, New York, 1992). Particularly common are Fourier-series PSI algorithms, see, e.g., P. de Groot, "Derivation of algorithms for phase-shifting interferometry using the concept of a data-sampling window", Applied Optics 34(22), 4723–4730 (1995).

The use of an unequally weighted average as described above is applicable to any interferometer that produces phase-shifted interferometry images. For example, the interferometer may be structured as a Linnik interferometer, a Michelson interferometer, or a Fizeau interferometer. Also, the source for the interferometer may be narrow-band or broad-band relative to the phase-shifting scanning range of the interferometer. For example, as described above, the interferometer may be a scanning interferometer that scans the OPD over a range comparable to, or larger than the coherence length of the source. In such cases, the fringe contrast varies over the range of the scan. Furthermore, the phase-shifting by the interferometer may be mechanical (e.g., varying the OPD by dithering the reference surface relative to the object surface). Alternatively, the phase-shifts may be introduced for a constant, non-zero optical path difference (such as in, e.g., a Fizeau interferometer) by changing the wavelength of the measurement and reference wavefronts. The latter application is known as wavelength tuning PSI and is described, e.g., in U.S. Pat. No. 4,594,003 to G. E. Sommargren.

In the embodiments described above, computer 310 processes of the phase-shifting interferometry data. More generally, the processing can be performed in an electronic controller that includes hardware, software, or a combination of both to control the other components of the system and process the phase-shifted images to extract the desired information about the measurement object. The processing steps described above can be implemented in computer programs using standard programming techniques. Such programs are designed to execute on programmable computers each comprising a processor, a data storage system (including memory and/or storage elements), at least one input device, and least one output device, such as a display or printer. The program code is applied to input data (e.g., the phase-shifted images from the CCD camera) to perform the functions described herein and generate output information (e.g., a lateral metrology image and/or a topography of the object surface), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein.

Other aspects, advantages, and modifications are within the scope of the following claims.

What is claimed is:

1. A method comprising:
    generating a sequence of phase-shifted interferometry images of an object surface relative to a reference surface; and
    calculating an unequally weighted average of the phase-shifted interferometry images to produce a final image, wherein the final image is a lateral metrology image.

2. The method of claim 1, wherein the unequally weighted average reduces interferometric fringes in the final image relative to those in a second final image produced by an equally weighted average of the phase-shifted interferometry images for an equally spaced phase shift sequence that spans $2\pi$.

3. The method of claim 1, wherein generating the sequence of phase-shifted interferometry images comprises:
    interfering a pair of wavefronts derived from a common source, wherein one of the wavefronts reflects from the object surface and the other wavefront reflects from the reference surface, and
    introducing a sequence of phase-shifts between the interfering wavefronts.

4. The method of claim 3, wherein each of the phase-shifted interferometry images corresponds to an intensity image formed by the interfering wavefronts for a corresponding one of the phase shifts.

5. The method of claim 3, wherein introducing the sequence of phase shifts comprises varying an optical path length difference between the interfering wavefronts.

6. The method of claim 5, wherein the optical path length difference is varied over a range smaller than the coherence length of the common source.

7. The method of claim 5, wherein the optical path length difference is varied over a range comparable to, or larger than, the coherence length of the source.

8. The method of claim 3, wherein introducing the sequence of phase shifts comprises varying a wavelength of the common source for a non-zero optical path length difference between the interfering wavefronts.

9. The method of claim 1, wherein the phase shift between each pair of adjacent images in the sequence of phase-shifted interferometry images is equal to a constant.

10. The method of claim 9, wherein the constant is equal to $\pi/4$ with respect to a wavelength in light used to produce the interferometry images.

11. The method of claim 1, wherein the sequence of phase-shifted interferometry images can be expressed mathematically as:

$$g_{i,j}(\theta_i, v) = Q_i(1 V \cos(\theta_i + v\phi_j))$$

where $g_{i,j}$ is an intensity for the $i^{th}$ pixel of the $j^{th}$ image in the sequence, $\theta_i$ is a phase for the $i^{th}$ pixel of the object surface relative to the reference surface, where v is a phase shift frequency with respect to a nominal phase shift sequence, $Q_i$ is a DC level for the $i^{th}$ pixel, V is a fringe contrast, and $\phi_j$ is a nominal phase shift for the $j_{th}$ image in the sequence.

12. The method of claim 11, wherein the final image, $A_j$, can be expressed as:

$$A_i(\theta_i, v) = \sum_j w_j g_{i,j}(\theta_i, v) \bigg/ \sum_j w_j,$$

where $w_j$ is a sequence of coefficients defining the unequally weighted average, and wherein the unequally weighted average requires $w_j$ to not be constant for all j.

13. The method of claim 12, wherein $\phi_j = (j-j_0)\alpha$, where $j = 0, \ldots, P-1$, P is the number of images in the sequence, $\alpha$ is a constant phase shift interval, and $j_0$ is a constant selected to cause $\phi_{(P-1)-j} = -\phi_j$.

14. The method of claim 13, wherein P=6 and $w_j$=[1,1,2,2,1,1].

15. The method of claim 13, wherein P=7 and $w_j$=[1,2,3,4,3,2,1].

16. The method of claim 13, wherein P=8 and $w_j$=[1,1,3,3,3,3,1,1].

17. The method of claim 11, further comprising calculating a surface profile of the object surface relative to the reference surface by applying a phase-shifting algorithm to the sequence of phase-shifted images to extract the phases $\theta_i$.

18. The method of claim 1, further comprising:
calculating a surface profile of the object surface relative to the reference surface based on the series of phase-shifted images.

19. A method comprising:
generating a sequence of phase-shifted interferometry images of an object surface relative to a reference surface; and
calculating an unequally weighted average of the phase-shifted interferometry images to produce a final image,
wherein the sequence of phase-shifted interferometry images can be expressed mathematically as:

$$g_{i,j}(\theta_i, v) = Q_i(1 + V\cos(\theta_i + v\phi_j))$$

where $g_{i,j}$ is an intensity for the $i^{th}$ pixel of the $j^{th}$ image in the sequence, $\theta_i$ is a phase for the $i^{th}$ pixel of the object surface relative to the reference surface, where $v$ is a phase shift frequency with respect to a nominal phase shift sequence, $Q_i$ is a DC level for the $i^{th}$ pixel, $V$ is a fringe contrast, and $\phi_j$ is a nominal phase shift for the $j^{th}$ image in the sequence,
wherein the final image, $A_i$, can be expressed as:

$$A_i(\theta_i, v) = \sum_j w_j g_{i,j}(\theta_i, v) \bigg/ \sum_j w_j,$$

where $w_j$ is a sequence of coefficients defining the unequally weighted average, and wherein the unequally weighted average requires $w_j$ to not be constant for all j,
wherein $\phi_j = (j - j_0)\alpha$, where $j = 0, \ldots, P-1$, $P$ is the number of images in the sequence, $\alpha$ is a constant phase shift interval, and $j_0$ is a constant selected to cause $\phi_{(P-1)-j} = -\phi_j$, and
wherein $w_j$ satisfies:

$$W(v=1) = 0 \text{ and } \left.\frac{\partial W(v)}{\partial v}\right|_{v=1} = 0, \text{ where } W(v) = \sum_j w_j \cos(v\phi_j).$$

20. The method of claim 19, wherein $w_j$ further satisfies $$\left.\frac{\partial^2 W(v)}{\partial v^2}\right|_{v=1} = 0.$$

21. A method comprising calculating an unequally weighted average of a sequence of phase-shifted interferometry images to produce a final image, wherein the final image is a lateral metrology image.

22. An apparatus comprising a computer readable medium which causes a processor to calculate an unequally weighted average of a sequence of phase-shifted interferometry images to produce a final image, wherein the final image is a lateral metrology image.

23. An apparatus comprising:
an interferometer which during operation generates a sequence of phase-shifted interferometry images of an object surface relative to a reference surface; and means, coupled to the interferometer, for calculating an unequally weighted average of the phase-shifted interferometry images to produce a final image, wherein the final image is a lateral metrology image.

24. The apparatus of claim 23, wherein during operation said means further calculates a surface profile of the object surface relative to the reference surface based on the sequence of phase-shifted interferometry images.

25. The apparatus of claim 23, wherein the unequally weighted average reduces interferometric fringes in the final image relative to those in a second final image produced by an equally weighted average of the phase-shifted interferometry images for an equally spaced phase shift sequence that spans $2\pi$.

26. The apparatus of claim 23, wherein the interferometer comprises one of a Linnik interferometer, a Michelson interferometer, and a Fizeau interferometer.

27. The apparatus of claim 23, wherein the interferometer comprises a scanning interferometer comprising a broadband source having a coherence length, wherein during operation the scanning interferometer interferes an object wavefront reflected from the object surface with a reference wavefront reflected from the reference surface and varies an optical path length difference between the wavefronts over a range larger than the coherence length of the source.

28. The apparatus of claim 23, wherein the interferometer comprises an unequal path length interferometer comprising a tunable source, wherein during operation the unequal path length interferometer introduces phase shifts between an object wavefront reflected from the object surface and a reference wavefront reflected from the reference surface by varying the wavelength of the source.

29. An method for obtaining a fringe-free intensity image from a sequence of phase-shifted interference patterns, the method comprising:
providing the sequence of phase-shifted interference patterns; and
calculating a weighted average of the phase-shifted interference patterns to produce the fringe-free intensity image.

30. The method of claim 29, wherein the sequence of phase-shifted interference patterns comprises more than four patterns.

31. The method of claim 29, wherein the weights for the weighted average are selected to reduce the sensitivity of the weighted average to a deviation in the phase increment between the phase-shifted interference patterns.

32. The method of claim 31, wherein the weights define a window function, and the derivative of the Fourier transform of the window function with respect to the deviation in the phase increment is zero when the deviation is zero.

33. The method of claim 29, further comprising calculating a surface topology map from the sequence of phase-shifted interference patterns.

34. The method of claim 29, further comprising:
using an interferometry system to provide the sequence of phase-shifted interference patterns.

35. The method of claim 34, wherein the interferometry system is a white-light scanning interferometry system.

36. The method of claim 34, wherein the interferometry system is a wavelength-tuning interferometry system.

37. An interferometry system comprising:
an interferometer for providing a sequence of phase-shifted interference patterns; and
means, coupled to the interferometer, for calculating a weighted average of the phase-shifted interference patterns to produce a fringe-free intensity image.

38. The system of claim 37, wherein during operation said means further calculates a surface topography map from the sequence of phase-shifted interference patterns.

* * * * *

UNITED STATES PATENT AND TRADEMARK OFFICE
CERTIFICATE OF CORRECTION

PATENT NO. : 7,068,376 B2
APPLICATION NO. : 10/419061
DATED : June 27, 2006
INVENTOR(S) : Peter De Groot It is certified that error appears in the above-identified patent and that said Letters Patent is hereby corrected as shown below:

Cover Page, Other Publications, first article, first line, replace "Interfrometry" with --Interferometry--

Column 4
Line 29, replace "$W_j=[1,1,3,3,3,3,1,1]$" with --$w_j=[1,1,3,3,3,3,1,1]$--
Line 33, replace "including" with --include--

Column 8
Line 13, replace "100" with --$\varphi$--

Column 10
Line 24, before "window" delete "the"

Column 14
Line 43, replace "$A_j$" with --$A_i$--

Column 16
Line 36, before "method" replace "An" with --A--

Signed and Sealed this

Twentieth Day of November, 2007

JON W. DUDAS
*Director of the United States Patent and Trademark Office*